United States Patent
McAllister

(10) Patent No.: US 8,239,837 B2
(45) Date of Patent: Aug. 7, 2012

(54) REMOTELY HANDLING EXCEPTIONS THROUGH STAF

(75) Inventor: Cameron J. McAllister, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 12/120,691

(22) Filed: May 15, 2008

(65) Prior Publication Data

US 2008/0288924 A1 Nov. 20, 2008

(30) Foreign Application Priority Data

May 15, 2007 (GB) .................................. 07108204.4

(51) Int. Cl.
*G06F 9/44* (2006.01)

(52) U.S. Cl. ........................................ 717/127; 717/124

(58) Field of Classification Search ........... 717/124–135
See application file for complete search history.

(56) References Cited

U.S. PATENT DOCUMENTS

| | | | |
|---|---|---|---|
| 6,031,990 A * | 2/2000 | Sivakumar et al. | 717/124 |
| 6,173,440 B1 * | 1/2001 | Darty | 717/130 |
| 6,836,892 B2 * | 12/2004 | Ikoma et al. | 719/313 |
| 7,340,725 B1 * | 3/2008 | Robinson et al. | 717/124 |
| 7,506,318 B1 * | 3/2009 | Lindo et al. | 717/130 |
| 7,542,278 B2 * | 6/2009 | Liu et al. | 361/679.33 |
| 7,587,638 B2 * | 9/2009 | Shah et al. | 714/47.3 |
| 7,840,844 B2 * | 11/2010 | Garland et al. | 714/33 |
| 2002/0188713 A1 * | 12/2002 | Bloch et al. | 709/223 |
| 2003/0126586 A1 * | 7/2003 | Sluiman et al. | 717/124 |
| 2004/0148590 A1 * | 7/2004 | Lapitski et al. | 717/124 |
| 2005/0144593 A1 * | 6/2005 | Raghuvir et al. | 717/124 |

* cited by examiner

*Primary Examiner* — Hung T Vy
*Assistant Examiner* — Mongbao Nguyen
(74) *Attorney, Agent, or Firm* — Lieberman & Brandsdorfer, LLC

(57) ABSTRACT

An apparatus for communicating between a child test program and a parent test program in a test environment. A child test framework is provided to catch an exception thrown by the child test program. In addition, a marshalling component is provided in communication with the child test program and the child test framework. The marshalling component converts exception data for the exception into a format for transmission by a communication means to a parent test framework.

13 Claims, 4 Drawing Sheets

REMOTELY HANDLING EXCEPTIONS THROUGH STAF

FIELD OF THE INVENTION

The present invention relates to a technology for controlling parent and child tests in test suites, and in particular, for enabling failures in child tests to be more efficiently handled.

BACKGROUND OF THE INVENTION

One of the hardest things to do in test environments is to know how to handle test failures. Some tests may fail for a variety of reasons, some of which may be acceptable, or even expected (as for example, in testing the correctness of a program's response to incorrect inputs), and others are not. Generally this is handled with return codes. Return codes are very difficult to manage. If tests are calling other tests, then the higher level tests will often need to know how to handle a great number of different return codes in different situations. Generally this is ignored, and tests end up returning only a pass/fail value, and losing a lot of information in how the test failed. To find out exactly how a specific test failed may require a parse of its logs, which is both difficult and time consuming.

It would thus be desirable to have a technology for controlling parent and child tests in test suites, and in particular, for enabling failures in child tests to be more efficiently handled.

SUMMARY OF THE INVENTION

In one aspect of the invention, an apparatus is provided for communicating between a child test program and a parent test program in a test environment. A child test framework operable to catch an exception thrown by the child test program is provided. In addition, a marshalling component operable in communication with the child test program and the child test framework is provided to convert exception data for the exception into a format for transmission by a communication means to a parent test framework.

In another aspect of the invention, a method is provided for communicating between a child test program and a parent test program in a test environment. A child test framework catches an exception thrown by the child test program. Thereafter, a marshalling component in communication with said child test program and the child test framework, converts exception data for the exception into a format for transmission by a communication means to a parent test framework.

In yet another aspect of the invention, a computer program comprising computer program code is provided to, when loaded into a computer system and executed thereon, cause the computer system to communicate between a child program and a parent test program. Computer code in the form of program test code is provided to catch an exception thrown by the child test program. In addition, program code in communication with the program test code is provided to convert exception data for the exception into a format for transmission by to a parent test framework. Conversion of the exception data is performed by a marshalling component operable in communication with the child test program and the child test framework. The conversion converts exception data for the exception into a format for transmission by a communication means to a parent test framework. In addition, instructions are provided to return exception data communicated to the parent test for identifying a cause of failure in the child test program.

Preferred embodiments of the invention thus contemplate, in their broadest aspect, a technology for controlling parent and child tests in test suites, and in particular, for enabling failures in child tests to be more efficiently handled.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

Figure 1:
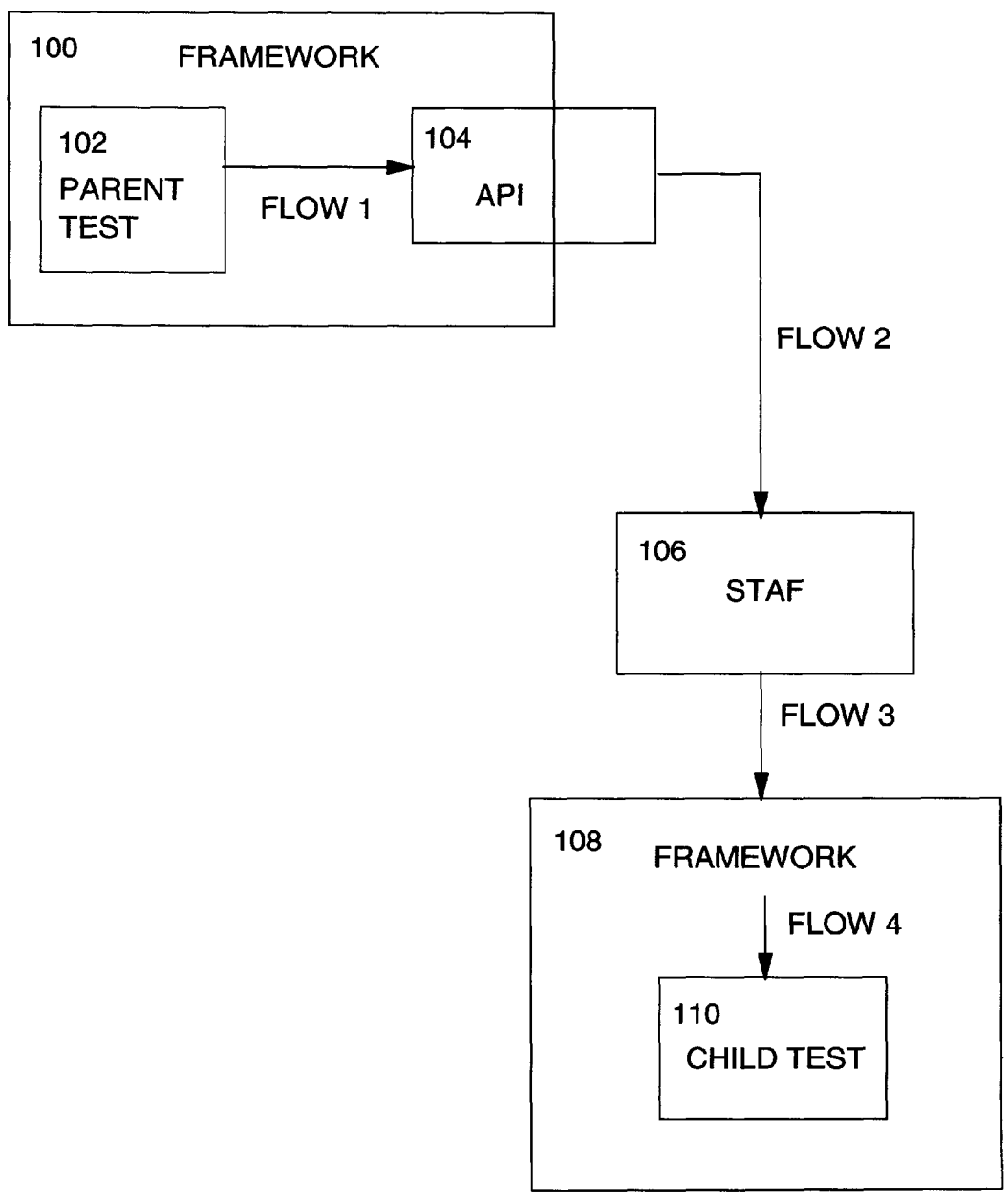
FIG. 1 shows in schematic form an arrangement of apparatus in accordance with a preferred embodiment of the present invention in a first state.

A preferred embodiment of the invention is suitably implemented in a test environment in which a harness or framework is provided, using, for example, the well-known Software Testing Automation Framework, or "STAF".

In test environments controlled by a STAF framework, the presently known process performed by one test executing another test and retrieving its success disposition is:

1. The parent test program submits a request to STAF to run a process, which for this purpose is a specified child test program to be executed.
2. The second process (or child test) executes, and when it terminates, its System out/error and Return code are marshalled by STAF, and placed on the queue of the parent process.
3. The parent process then looks at its queue (it can perform a wait to wait for something to appear) and unmarshalls the data on the queue to retrieve the return code of the child process.

A use exception is an informative mechanism used to state the causes of test failures. If a test provided with exception facilities ends without throwing an exception, then it has passed; otherwise it fails. This gives the following significant advantages:

1. Test can pass failures upwards without explicitly writing code to do so, simply by not handling exceptions of that type.
2. Test can handle failures in a very generic way, via inheritance, so higher level tests don't need to worry about specifics of lower level tests.
3. Tests can be made consistent and easily comprehensible.

Environments such as STAF do a lot of the hard work involved in automating test suites, and so are very attractive to use for launching tests. They provide services such as process invocation, inter-process communication, semaphores, logging, and so on.

However, these environments conventionally do not have a mechanism to allow exceptions to escalate upwards because the runtime frameworks for tests isolate the tests from one another. If a process launched under STAF terminates as a result of an exception, the exception may or may not appear in the standard error output. The owning process, also known as the parent test, is not notified, and is thus not enabled to take any action on the basis of the child exception.

In one embodiment, exceptions are allowed to be marshalled (that is, wrapped up into the STAF return data to be picked up safely at the other end) into the STAF process return message, and then translated back into exceptions and thrown in the calling process. This would then look as if the exception had happened locally, and everything was running in one place, simplifying everything greatly for the test case writer.

However this solution is not trivial, as it requires the exceptions to be caught. The encapsulation provided by STAF itself does not allow processes, such as child tests, access to their marshalled return data. Furthermore, at the parent test program end, the exceptions must be reconstructed and re-thrown smoothly, so as not to have significant time delay, and to ensure that the parent test program does in fact receive the exceptions, instead of just ignoring them.

In one embodiment of the present invention, a test framework is provided to wrap up the process invocation and control methods, to provide a simple mechanism to pass exceptions between entities.

Figure 2:
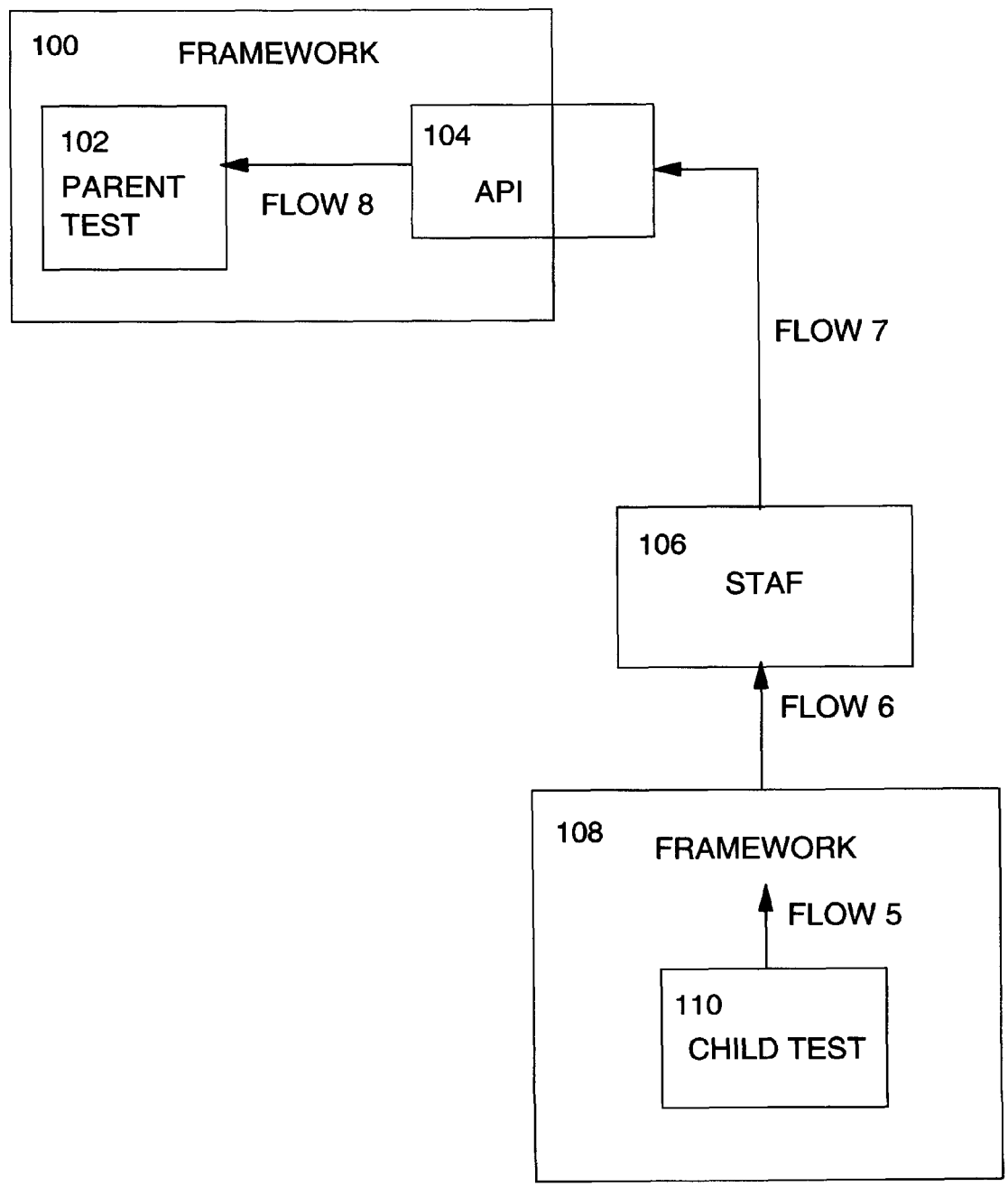
FIG. 2 shows in schematic form an arrangement of apparatus in accordance with a preferred embodiment of the present invention in a second state.

The process according to the preferred embodiment is summarized in FIGS. 1 and 2.

FIG. 1 shows a first framework (100), in which a parent test program (102) is executed. Parent test (102) is in communication with STAF (106) via an application programming interface (API) (104) through FLOW 1 and FLOW 2. In turn, STAF (106) is in communication with a second framework (108) through (FLOW 3). A child test program (110) is executed by FLOW 4 responsive to the request from parent test program (102) via the API (104) and STAF (106).

In a preferred embodiment of the present invention, parent test program (102) goes through the following stages:
 a) it performs any environment changes/set up that it needs;
 b) it starts any child processes/tests as required;
 c) it waits on the child processes to end normally or abnormally; and
 d) it handles or escalates any exceptions thrown by the child processes.

Once step (d) is complete without itself failing, the test may return to step a) again, or end successfully.

The following is pseudo code written in Java™ (Java and all Java-related trademarks and logos are trademarks of Sun Microsystems Inc. in the United States of America and other countries). The method exposed to the parent test program to launch a child test program, in one embodiment, comprises:
ProcessReturnData runTestInSequence(String test, String[ ] params, int timeout) throws TestFrameworkException
String runTestInParallel(String test, String[ ] params) throws TestFrameworkException The difference between the runTestInSequence and runTestInParallel methods is as follows. In one embodiment, if a child test program is to be run synchronously, the runTestInSequence method is called, and this is translated to the STAF request as follows:
START COMMAND java PARMS com.ibm.staf.framework.Framework testcasename; <test> <params>ASYNC SAMECONSOLE RETURNSTDOUT RETURNSTDERR NOTIFY ONEND WAIT <timeout>

The above-outlined commands are explained as follows:
START COMMAND java PARMS com.ibm.staf.framework.Framework tells STAF to run the framework (from Java), and
testcasename; <test> <params>tells the framework to execute the specified test with the specified parameters that have been passed to it.
WAIT <timeout>tells STAF if the test doesn't complete in <timeout> time, then terminate the process and return to the parent process.

STAF then creates a new framework which invokes the new test which then executes.

Running a test in parallel is very similar to running a test in sequence. In one embodiment, the method used is called, for example, runTestInParallel, and it returns immediately with a process ID. The parent test program then needs to explicitly wait for the process itself afterwards, using the following method:
ProcessReturnData waitForProcess(String id, int timeout) throws TestFrameworkException The test is allowed to wait for more than one process to end (using a different method). In all cases, if there is a failure, a return code is not used, and instead an exception is thrown of a subtype of TestFrameworkException. If the test passes, then an object of type ProcessReturnData is returned; this is simply an object containing the marshalled-up STAF information.

Turning now to FIG. 2, child test program (110) is being executed via STAF (106) within the thin layer of the framework (108). The child test program can exit in one of two ways:
 1. End normally, or
 2. Throw an exception (or not handle a thrown exception).

For exemplary purposes, assume the child test program throws an exception. At this point a new facility within the framework around the child test program catches the exception at FLOW 5. As mentioned above, it is desirable to be able to marshall up all the data from the exception into the STAF return data, and return that. However, in a conventional system, the marshalled data is not accessible to the child test, as it is owned by the service that executed it. The only way it can be communicated to the parent process is through standard out/error, which is picked up by the process service and marshalled up, and returned to the parent.

The framework of the preferred embodiment encodes the exception data in the STAF return data. Therefore, the information contained in the exception is now converted to a string format, and printed out in the standard error stream. However, if the child test program that has been run has thrown an exception, this will also appear in the standard error output. Therefore, before any exception can be output, the system must print out a delimiter that limits the scope of any later search for exceptions in the standard error output to just the relevant process. This is because a child test program may itself run a further test process (a "grandchild" test), which may have returned an exception that has been handled. The original parent needs to be able to distinguish such a grandchild exception in the error output, so that it can ignore it and only deal with the exception thrown by its own child.

The framework in which the child process executed then terminates, and STAF picks up the marshalled data at FLOW 6.

The Return code is picked up from STAF by the parent process. Finally, the PROCESS command returns to the parent test program with the marshalled data. The framework in which the parent test program is executing picks this information up FLOW 7 and decodes it back into an exception. The parent framework picks up the standard error stream, and searches backwards through it until either:
 1. It finds a wrapped up exception, or
 2. It finds the marker delimiting the searchable scope for its child process exceptions.

If an exception is found, the framework parses it, and may then create a new exception of the same type, but filling in all the data the same as the original exception, and then throwing it. This occurs, in the example, from the method call runTestInSequence to invoke the test (if the invocation was done synchronously), or from the waitForProcess method (if the invocation was done asynchronously). Otherwise, those methods just return the marshalled data to the parent test program at FLOW 8.

In one embodiment of the present invention in the form of an apparatus or arrangement of apparatus advantageously addresses the problem of providing a technical means for controlling parent and child tests in test suites, and in particular, for enabling failures in child tests to be efficiently handled.

Figure 3:
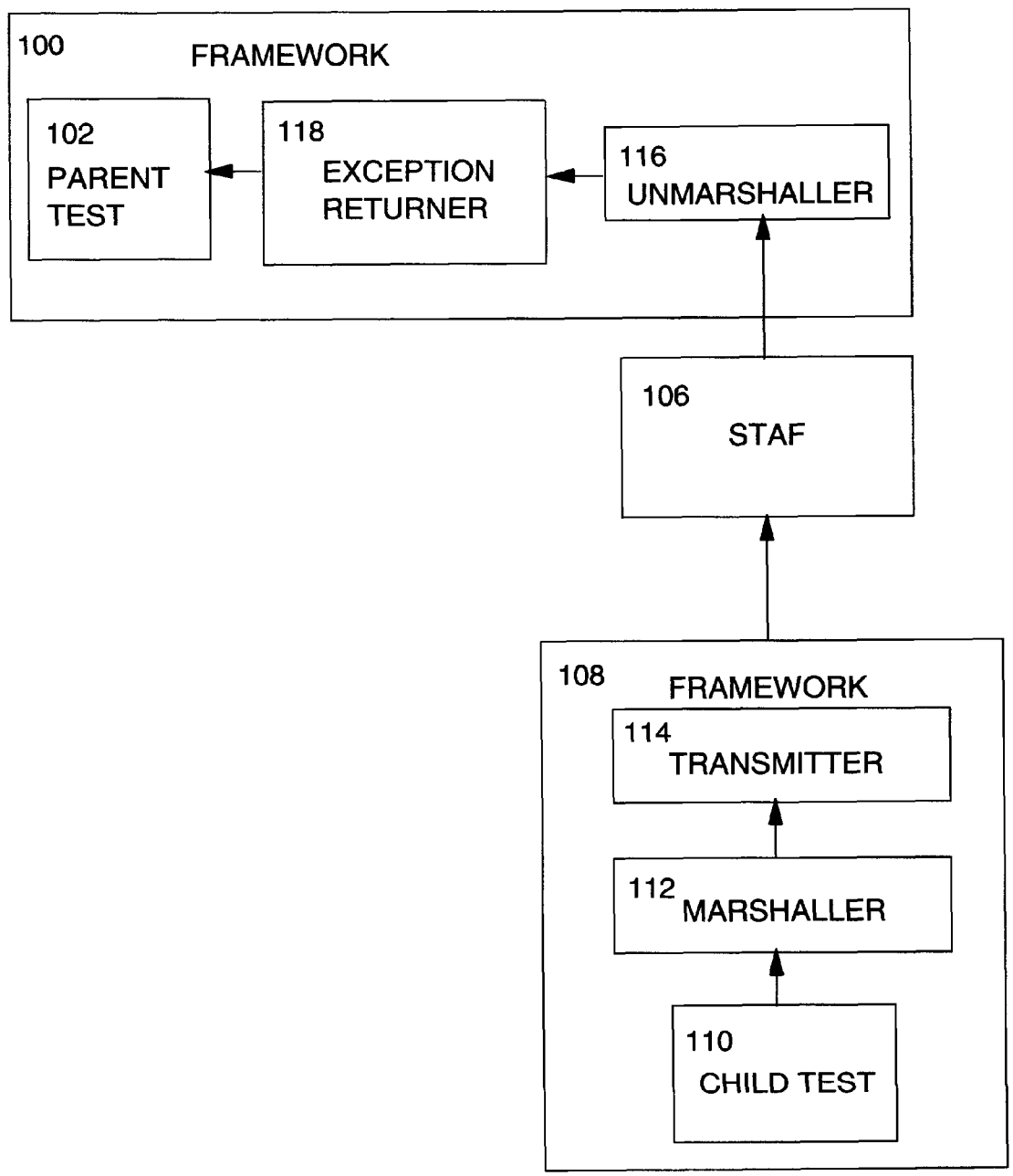
FIG. 3 shows in schematic form further details of an arrangement of apparatus in accordance with a preferred embodiment of the present invention.

FIG. 3 shows in more detail an arrangement of apparatus in accordance with the preferred embodiment of the present invention.

In child framework (108), child test program (110) is in communication with both the child framework (108) and with marshaller (112), which is operable to marshall the exception data and pass it to transmitter (114), which communicates it, via STAF (106) to the parent framework (100). In parent framework (100), unmarshaller 116 receives the marshalled data and unmarshalls it, passing the unmarshalled data to exception returner component (118), which then returns the unmarshalled exception data to parent test program (102) for processing.

Figure 4:
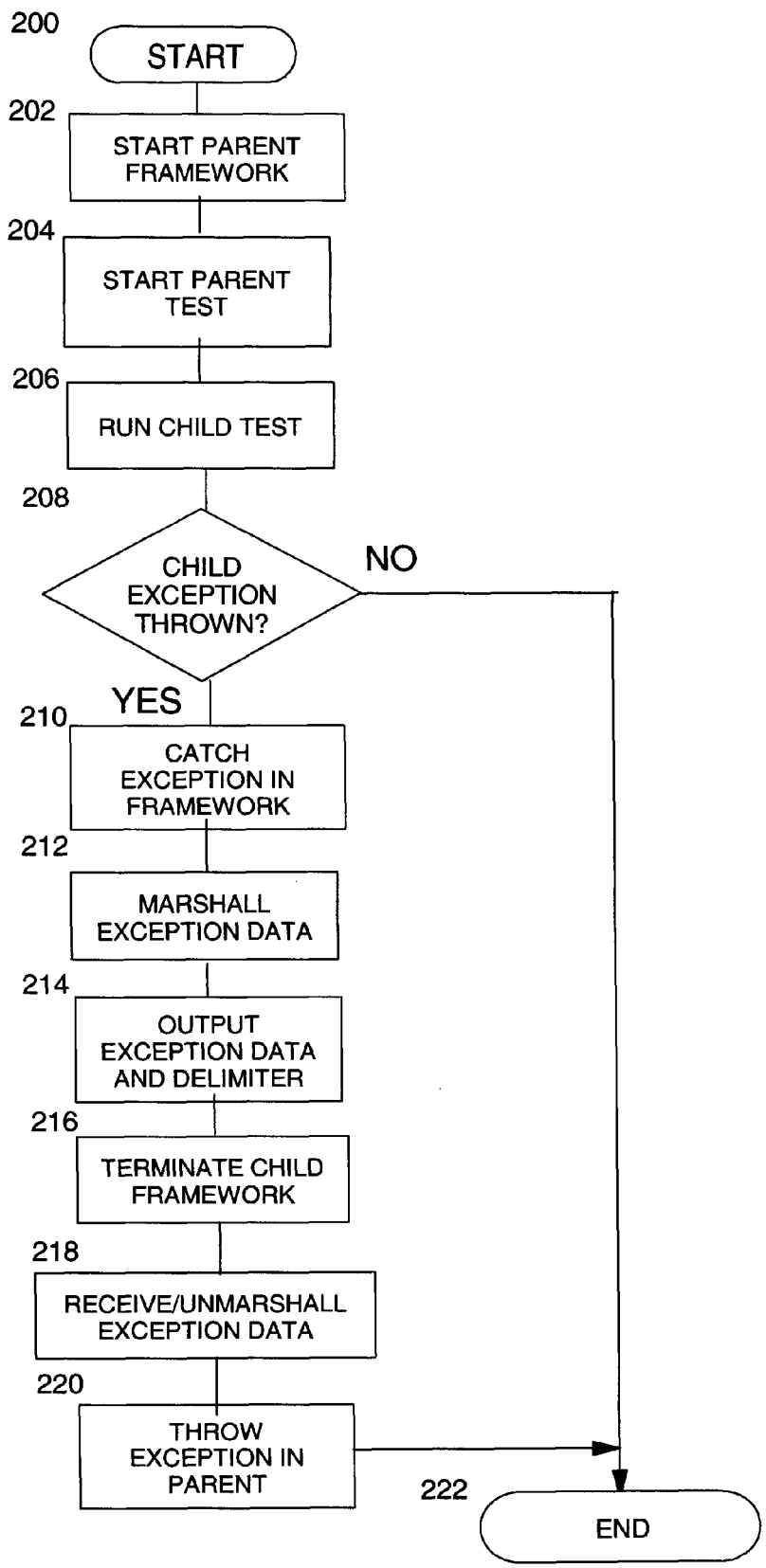
FIG. 4 shows in flowchart form one method or logic arrangement in which a preferred embodiment of the present invention may be implemented.

Turning now to FIG. 4, there are shown in flowchart form the steps of a method or logic arrangement according to a preferred embodiment of the present invention.

In FIG. 4, the method or logic arrangement includes steps beginning at START step (200). At step (202), the parent test framework is started, and at step (204) the parent test program is started. At step (206), a request to run a child test program is issued, and the child test program begins execution inside a child framework. At decision step (208), if no an exception has been thrown in the child test, the process of handling exceptions ends. If, however, an exception is thrown in the child test, at step (210), the child framework catches the exception and, at step (212), marshalls the exception data. At step (214), the exception data and a delimiter (to limit the scope of the later search for exception data in the output to the scope of the parent's child process) are output. At step (216), the child framework terminates, as it has completed its work of providing a runtime environment for the now terminated child test. At step (218), the parent framework receives and unmarshalls the exception data delimited as within the scope of the child test. At step (220) the corresponding exception is thrown in the parent test. The method according to the preferred embodiment then completes at END step (222).

The preferred embodiment of the present invention in the form of a method or logic arrangement thus advantageously addresses the problem of providing a technical means for controlling parent and child tests in test suites, and in particular, for enabling failures in child tests to be more efficiently handled.

The method, in one embodiment, receives, by a first parent test framework component, the converted exception data from the communication means; converts, by a second parent test framework component, the exception data back from the format for transmission; and returns the converted exception data for processing by the parent test. The parent test program and the child test program form a portion of a hierarchy of a plurality of tests, and wherein the child test framework and the parent test framework form a portion of a hierarchy of a plurality of test frameworks. In one embodiment, the parent test program invokes the child test program in synchronous mode. Similarly, in one embodiment, the communication means communicates using a standard error output stream and inserts the exception data and one of a marker or a delimiter into the standard error output stream. The marker or delimiter comprises an indication that exception data relates to a child test program of a determined parent test.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

The apparatus further comprises: a first parent test framework component operable to receive the converted exception data from the communication means; a second parent test framework component operable to convert the exception data back from the format for transmission; and an exception return component for returning the converted exception data for processing by the parent test. In one embodiment, the child test framework and the parent test framework comprise a modified STAF. Furthermore, in one embodiment, parent test program and the child test program form a portion of a hierarchy of a plurality of tests, and wherein the child test framework and the parent test framework form a portion of a hierarchy of a plurality of test frameworks. The parent test program may be operable to invoke the child test program in synchronous mode. In one embodiment, the communication means is operable to communicate using a standard error output stream, and wherein the communication means inserts the exception data and a marker or a delimiter into the standard error output stream. In one embodiment, the marker or delimiter comprises an indication that exception data relates to a child test program of a determined parent test.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer infrastructure to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

I claim:

1. An apparatus for communicating between a child test program and a parent test program in a test environment, comprising:
said parent test program, in communication with a processor, said parent test program to start said child test program;
a child test framework configured to catch an exception thrown by said child test program;
a marshalling component configured to in communication with said child test program and said child test framework to convert exception data for said exception into a format for transmission by a communication means to a parent test framework, wherein said communication means is configured to communicate using a standard error output stream, and wherein said communication means inserts said exception data and a delimiter into said standard error output stream and said delimiter comprises an indication that exception data relates to a child test program of a determined parent test, wherein each parent test program processes exceptions only for its own child test program; and
the parent test to identify a cause of failure in the child test program based upon said exception data.

2. The apparatus as claimed in claim 1, further comprising: a first parent test framework component configured to receive said converted exception data from said communication means; a second parent test framework component configured to convert said exception data back from said format for transmission; and an exception return component to return said converted exception data for processing by said parent test.

3. The apparatus as claimed in claim 2, wherein the child test framework and the parent test framework comprise a modified software testing automation framework (STAF).

4. The apparatus as claimed in claim 3, wherein said parent test program and said child test program form a portion of a hierarchy of a plurality of tests, and wherein said child test framework and said parent test framework form a portion of a hierarchy of a plurality of test frameworks.

5. The apparatus as claimed in claim 4, wherein said parent test program is configured to invoke said child test program in synchronous mode.

6. A method for communicating between a child test program and a parent test program in a test environment, comprising:
said parent test program starting said child test program;
catching, by a child test framework, an exception thrown by said child test program;
converting, by a marshalling component configured to in communication with said child test program and said child test framework, exception data for said exception into a format for transmission by a communication means to a parent test framework, wherein said communication means communicates using a standard error output stream and inserts said exception data and a marker into said standard error output stream, and said marker comprises an indication that exception data relates to a child test program of a determined parent test, wherein each parent test program processes exceptions only for its own child test program; and
returning exception data to the parent test for identifying a cause of failure in the child test program.

7. The method as claimed in claim 6, further comprising: receiving, by a first parent test framework component, said converted exception data from said communication means; converting, by a second parent test framework component, said exception data back from said format for transmission; and returning said converted exception data for processing by said parent test.

8. The method as claimed in claim 7, wherein said parent test program and said child test program form a portion of a hierarchy of a plurality of tests, and wherein said child test framework and said parent test framework form a portion of a hierarchy of a plurality of test frameworks.

9. The method as claimed in claim 8, wherein said parent test program invokes said child test program in synchronous mode.

10. A computer program comprising computer program code to, when loaded into a computer system and executed thereon, cause said computer system to perform instructions for communicating between a child test program and a parent test program in a test environment, the instructions comprising:
instructions for said parent test program to start said child test program;
instructions to catch, by a child test framework, an exception thrown by said child test program;
instructions to convert, by a marshalling component configured to in communication with said child test program and said child test framework, exception data for said exception into a format for transmission by a communication means to a parent test framework, wherein said communication means communicates using a standard error output stream and inserts said exception data and a marker into said standard error output stream, and wherein said marker comprise an indication that exception data relates to a child test program of a determined parent test, wherein each parent test program processes exceptions only for its own child test program; and
instructions to identify a cause of failure in the child test program based upon said exception data by the parent test.

11. The computer program product of claim 10, further comprising: instructions to receive, by a first parent test framework component, said converted exception data from said communication means; instructions to convert, by a second parent test framework component, said exception data back from said format for transmission; and instructions to return said converted exception data for processing by said parent test.

12. The computer program product of claim 11, wherein said parent test program and said child test program form a portion of a hierarchy of a plurality of tests, and wherein said child test framework and said parent test framework form a portion of a hierarchy of a plurality of test frameworks.

13. The computer program product of claim 12, wherein said parent test program invokes said child test program in synchronous mode.

\* \* \* \* \*